(12) United States Patent
Weinstock et al.

(10) Patent No.: US 11,502,840 B2
(45) Date of Patent: Nov. 15, 2022

(54) PASSWORD MANAGEMENT SYSTEM AND METHOD

(71) Applicant: Authentico Technologies AB, Bohus Björkö (SE)

(72) Inventors: Philip Lundin Weinstock, Bohus Björkö (SE); Aysajan Abidin, Heverlee (BE)

(73) Assignee: Authentico Technologies AB, Bohus Björkö (SE)

( * ) Notice: Subject to any disclaimer, the term of this patent is extended or adjusted under 35 U.S.C. 154(b) by 215 days.

(21) Appl. No.: 17/065,760

(22) Filed: Oct. 8, 2020

(65) Prior Publication Data
US 2022/0116220 A1  Apr. 14, 2022

(51) Int. Cl.
*H04L 9/32* (2006.01)
*H04L 9/08* (2006.01)

(52) U.S. Cl.
CPC .......... *H04L 9/3226* (2013.01); *H04L 9/0825* (2013.01); *H04L 9/3213* (2013.01); *H04L 9/3278* (2013.01)

(58) Field of Classification Search
CPC ... H04L 9/3226; H04L 9/0825; H04L 9/3213; H04L 9/3278; H04L 9/0894
See application file for complete search history.

(56) References Cited

U.S. PATENT DOCUMENTS

| | | | | |
|---|---|---|---|---|
| 5,875,296 A | * | 2/1999 | Shi | H04L 63/168 726/5 |
| 8,800,007 B1 | * | 8/2014 | Rajagopalan | H04L 63/0272 713/173 |
| 8,819,444 B2 | | 8/2014 | Shahbazi et al. | |
| 9,705,864 B2 | | 7/2017 | Wang et al. | |
| 10,715,327 B1 | * | 7/2020 | Ramanujan | H04L 9/50 |
| 2002/0178370 A1 | * | 11/2002 | Gurevich | G06F 21/606 713/184 |
| 2002/0188629 A1 | | 12/2002 | Burfoot | |
| 2004/0078604 A1 | * | 4/2004 | Rice | H04L 63/168 726/5 |
| 2010/0306547 A1 | * | 12/2010 | Fallows | H04L 63/0815 713/178 |
| 2011/0314290 A1 | * | 12/2011 | Fort | H04L 9/0822 713/176 |
| 2013/0166918 A1 | * | 6/2013 | Shahbazi | H04L 9/0863 713/183 |
| 2014/0189808 A1 | * | 7/2014 | Mahaffey | H04L 63/083 726/4 |
| 2016/0173464 A1 | * | 6/2016 | Wang | H04L 65/103 713/171 |
| 2016/0234014 A1 | * | 8/2016 | Bar-El | H04L 9/3271 |
| 2017/0279798 A1 | * | 9/2017 | Reynolds | H04L 63/0853 |
| 2019/0108328 A1 | * | 4/2019 | Abidin | H04L 9/3278 |

* cited by examiner

*Primary Examiner* — J. Brant Murphy
(74) *Attorney, Agent, or Firm* — RMCK Law Group, PLC

(57) ABSTRACT

The present disclosure relates to a password management system and to a method for operating such a password management system. The password management system operates in communication with a client device running a cookie enabled browser application. The present disclosure also relates to a method for allowing access to restricted information stored at a server.

14 Claims, 3 Drawing Sheets

PASSWORD MANAGEMENT SYSTEM AND METHOD

TECHNICAL FIELD

The present disclosure relates to a password management system and to a method for operating such a password management system. The password management system operates in communication with a client device running a cookie enabled application. The present disclosure also relates to a method for allowing access to restricted information stored at a server.

BACKGROUND

When storing e.g. user passwords at an Internet connected server comprising a database, such as a cloud server, it is necessary to place a lot of effort into preventing security breaches such that the passwords become available to e.g. a hacker. A typical way of increasing the security of the database/cloud server is to encrypt the passwords, such that they only may be accessed by a user having the correct encryption/decryption key.

However, there is an obvious risk that a third-party with enough resources will be able to decipher the passwords. That is, in case the cloud server is hacked this may have serious impact on a large plurality of users having stored their passwords data at the cloud server. In most cases, a central database will encrypt passwords once received using the same key. Thus, if the system is successfully hacked, all passwords stored at the database can be compromised. Obviously, such an issue could greatly impact on the user's view on the company storing the passwords, thus possibly having a great impact on the business and reputation of said company.

An example of an implementation trying to overcome some of these problems is disclosed in U.S. Pat. No. 8,819,444. Specifically, U.S. Pat. No. 8,819,444 implements a solution where the user passwords are never stored at the cloud server. Rather, the user enters his password into a browser and the browser submits e.g. a hashed version of the password to the server for validation. Credential management is thus decentralized in that encryption and decryption of the user's personal information happens on the user's system.

The suggested implementation will improve the security of the database/server, however also a hashed version of the password could potentially be useful for a hacker. Thus, it would be desirable to additionally improve the security when storing e.g. user passwords at a cloud server/database, ideally limiting the usefulness of the data stored at the cloud server in case of a hacker getting access to the data.

SUMMARY

According to a first aspect of the present disclosure, the above is at least partly met by a computer implemented method for operating a password management system comprising a server arranged in communication with a client device, the client device running a cookie enabled application, wherein the method comprises receiving, at the server, a representation of a user password provided from the client device, storing the representation of the user password at a computer memory associated with the server, receiving, at the server, a server specific key, encrypting, at the server, the password using the server specific key, forming, at the server, an access token based on the encrypted password, wherein the access token has a predefined lifetime, forming, at the server, a cookie comprising the access token, and sending, by the server, the cookie to the client device for storage in a computer memory arranged in association with the client device.

In accordance to the present disclosure the user password is preferably only stored in an intermediate state at the server. Rather, the server is instead adapted to store an encrypted version of the user password, where the user password has been encrypted with a server specific key.

Thus, an advantage following the scheme applied by the present disclosure is that the risk of e.g. a potential hacker getting hold of the "real" user password is reduced, specifically since the hacker in such a case first must get hold of the server specific key. In a preferred embodiment of the present disclosure the server further comprises a hardware element implemented as a physical unclonable function (PUF), and the server specific key is formed based on information received from the PUF. Accordingly, the server specific key may in such an embodiment not easily be stolen and used at "another location" since the PUF/hardware element is physically connected to the server.

The PUF will by definition be specific for each server and thus not possible to duplicate and arrange at a second/separate password storage arrangement. Thus, even in case the hacker would get access to the information available at the computer memory/database/cloud server, this information will not be useful without the physical access to also the PUF.

The PUF is a function that is embodied in a physical structure and is easy to evaluate but hard to predict. An individual PUF device must be easy to make but practically impossible to duplicate, even given the exact manufacturing process that produced it. In this respect PUF, which are the hardware analog of a one-way function, or essentially random functions bound to a physical device in such a way that it is computationally and physically infeasible to predict the output of the function without actually evaluating it using the physical device. It should be understood that the output from the PUF will be slightly different for each time the password is provided as an input, i.e. including a randomness component. Thus, a verification process, as will be discussed further below, will have to take this into account for matching the encrypted version of the user password and a representation of a candidate password as provided as an input during such a verification process.

In an embodiment of the present disclosure, receiving the representation of the user password comprises receiving, at the server, the user password from the client device, and forming, at the server, the representation of the user password based on the user password and an at least partly random number. The at least partly random number may in accordance to the present disclosure be related to a so called "salt" that is used as an additional input to a one-way function that "hashes" data. The salt is preferably stored at the computer memory associated with the server and may in some embodiments preferably be specific for an identity of the user device.

In accordance with the present disclosure, the encrypted user password is used for forming an access token, where the access token has a predefined lifetime. The access token is in turn used in the formation of a cookie that may be used for e.g. accessing user specific data that is stored at the server, such as e.g. user profile data, credit card information, etc. As understood from the elaboration above, the user provides his password and essentially gets a cookie back that is to be used by e.g. an application that is operated by the user. Once the user is in contact with the server, such as within a "session", the user may continuously access his user data without having to resort to enter his user password. Rather, the cookie may be used for accessing the user data (as will be further elaborated below).

It should be understood that the cookie enabled application for example may be a browser running at the client device. Other possible applications exist and are within the scope of the present disclosure.

In a preferred embodiment the lifetime for the access token is based on such a session formed between the server and the client device. That is, once the user leaves the session the cookie may be allowed to expire, effectively meaning that the user typically will have to again enter his password once entering into a new session with the server. As an alternative, the lifetime of the access token is set by the client device, effectively meaning that the cookie may be allowed to reside with the client device for more (or also less) than a single session.

As indicated above, the computer memory, the PUF and the processing circuitry are preferably comprised with the server, whereby the server is arranged in a networked connection, such as the Internet, to the client device. The server is preferably a cloud server. The client device is typically provided with a user interface (UI) for receiving the password from the user and configured to transmit the user password to the server using the network connection.

It should be understood that it may be desirable to encrypt the user password prior to transmitting the password to the server, thus allowing also the communication between the client device and the server to be secure. In such an implementation the server will decrypt the password prior to providing the password as an input to the PUF. The client device may for example be a laptop, mobile, tablet, thereby improving also local password storage.

According to a second aspect of the disclosure there is provided a method for allowing access to restricted information stored at a server, the server arranged in communication with a client device, the client device running a cookie enabled application, the method comprising receiving, at the server, a request from the client device for accessing the restricted information, the request including a cookie comprising an access token formed in accordance to any one of the preceding claims, and verifying the access token, at the server, for allowing the client device access to the restricted information.

In line with the above discussion, the cookie may be used for e.g. accessing restricted user information that is stored at the server in a verifiable manner, where the cookie is used for "unlocking" the restricted user information. Accordingly, the access token comprised with the cookie (again in line with the above discussion) is decrypted to derive the user specific key to access the restricted information.

According to a third aspect of the present disclosure there is provided a password management system, the system comprising a server arranged in communication with a client device, the client device running a cookie enabled application, wherein the server is adapted to receive a representation of a user password provided from the client device, store the representation of the user password at a computer memory associated with the server, receive a server specific key, encrypt the password using the server specific key, form an access token based on the encrypted password, wherein the access token has a predefined lifetime, form a cookie comprising the access token, and send the cookie to the client device for storage in a computer memory arranged in association with the client device. This aspect of the present disclosure provides similar advantages as discussed above in relation to the first aspect of the present disclosure.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

Some portions of the detailed descriptions which follow are presented in terms of algorithms and symbolic representations of operations. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present disclosure is not described with reference to any particular programming language. It will be appreciated that a variety of programming languages may be used to implement the teachings of the present disclosure as described herein.

Furthermore, software executed by e.g. a processing circuitry comprised with the server for operation in accordance to the present disclosure may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art.

BRIEF DESCRIPTION OF THE DRAWINGS

The various aspects of the disclosure, including its particular features and advantages, will be readily understood from the following detailed description and the accompanying drawings, in which.

DETAILED DESCRIPTION

Figure 1:
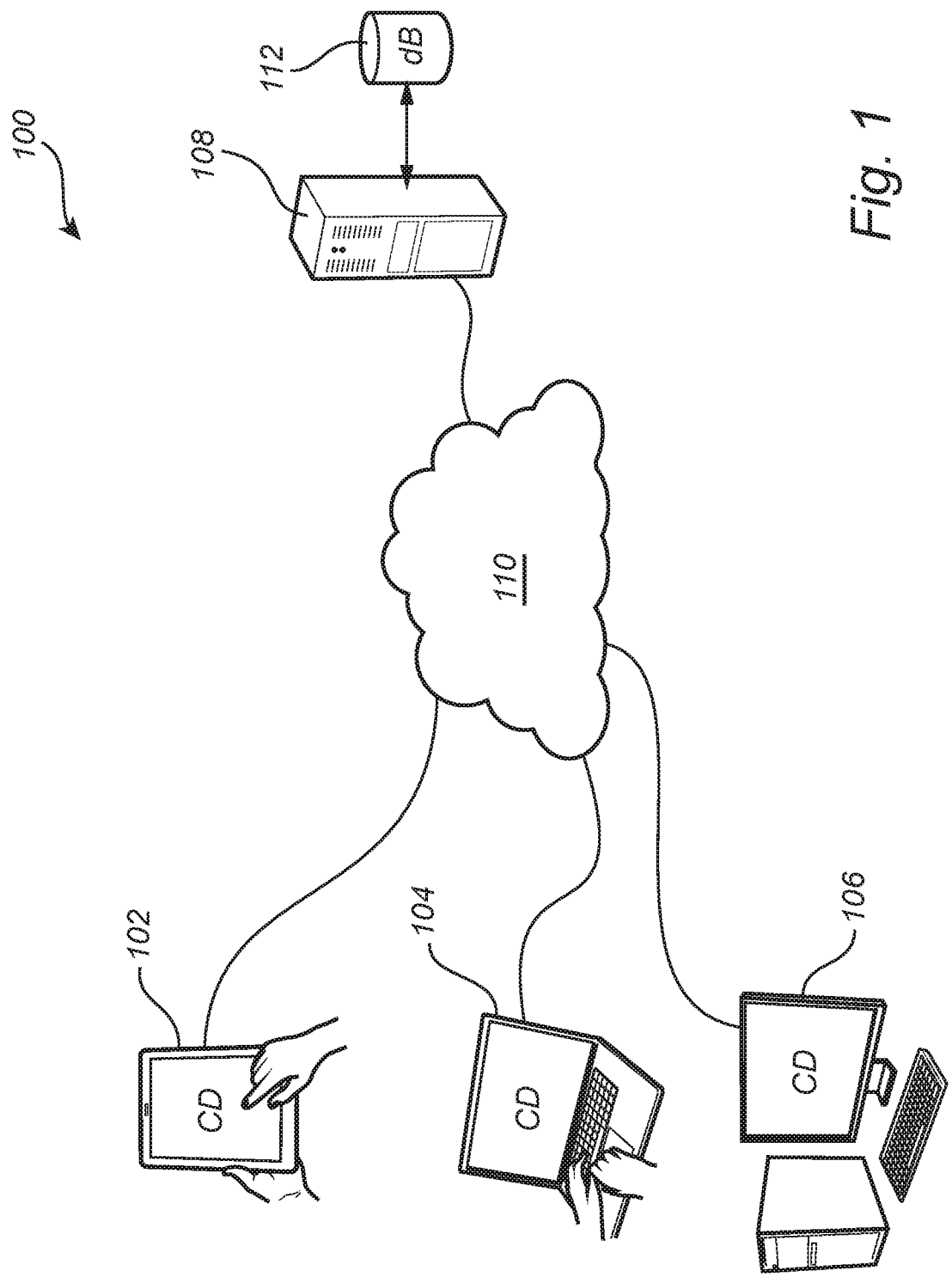
FIG. 1 conceptually illustrates a client-server environment where the present concept may be applied, FIG. 2 conceptually illustrates the server according to a currently preferred embodiment of the present disclosure.

The present disclosure will now be described more fully hereinafter with reference to the accompanying drawings, in which example embodiments of the present disclosure are shown. This disclosure may, however, be embodied in many different forms and should not be construed as limited to the embodiments set forth herein; rather, these embodiments are provided for thoroughness and completeness, and fully convey the scope of the present disclosure to the skilled addressee. Like reference characters refer to like elements throughout Referring now to the drawings and to FIG. 1 in particular, there is depicted, conceptually, a client-server environment 100 where the present concept may be applied. The client-server environment 100 comprises a plurality of client device 102, 104, 106 and a cloud server 108, where the client devices 102, 104, 106 and the server 108 are connected by means of network connection, such as over the Internet 110.

As discussed above, the client devices 102, 104, 106 may for example include mobile phones, desktop computers, laptops, tablets, etc. each provided with a web browser. During operation the individual users of the of the client devices 102, 104, 106 may have a desire to access privileged information, for example stored at a database 112 connected to the server 108.

Figure 2:
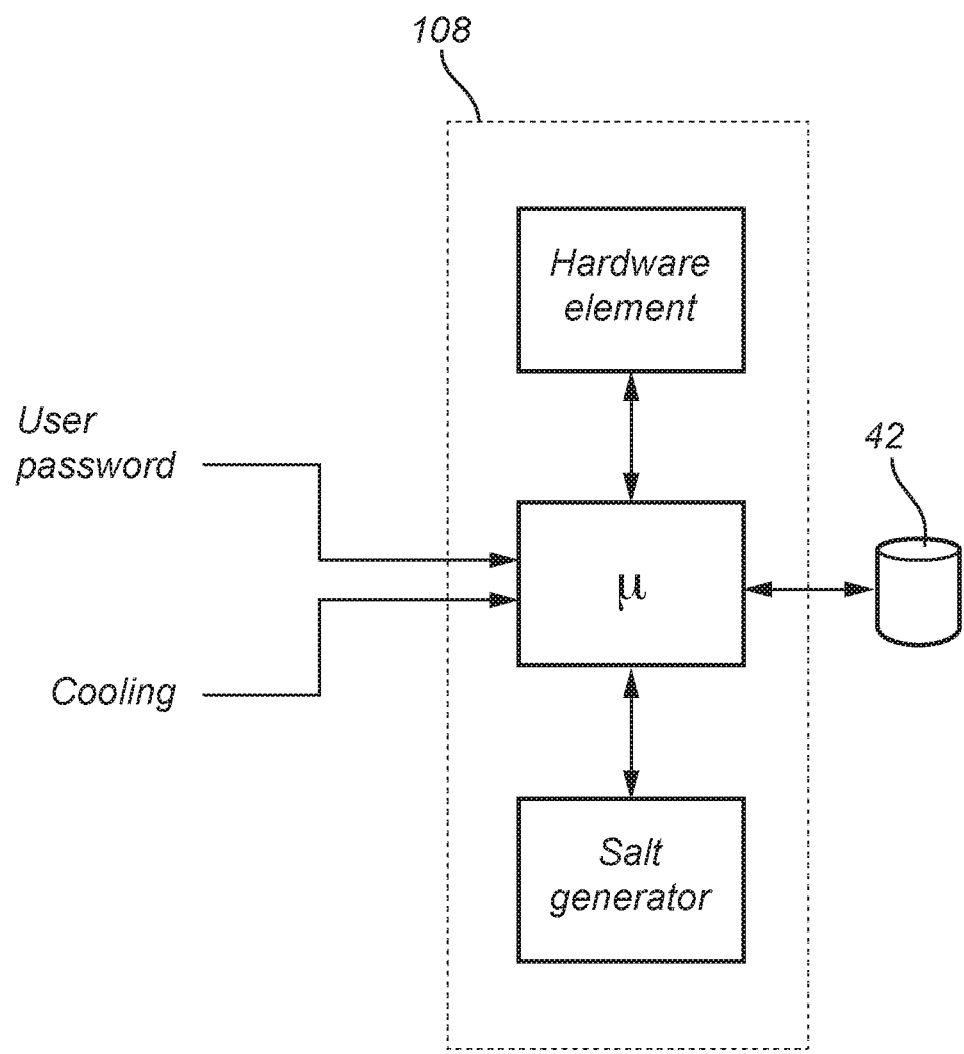

To access the information, a client device such as client device 102 must be verified as the correct user/device for the specific information. In accordance to the present disclosure, with further reference to FIG. 2, the client device 102 must first go through an enrollment process whereby a representation of a user password is stored at a computer memory of the server 108.

The server 108 preferably comprises a control unit 202, a hardware element implemented as a physical unclonable function (PUF) 204 and a salt generator 206. The server 108 further comprises an external interface for allowing the user password to be received from the client device 102, 104, 106 as well as for providing a cookie to the user device 102, 104, 106 as will be further elaborated below. The server 108 is also adapted to receive a user identity, such as a user login.

In accordance to the present disclosure, a unique user specific key is generated by the control unit 202 based on the user password received from the client device 102, 104, 106, a salt generated by the salt generator 206 and a PUF-based key provided by the PUF. Each user's restricted information is encrypted with the user specific key. Use of the salt ensures users with the same password have different keys, and the salt can be the same as in password protection. In line with the present disclosure, the keys are temporarily stored in e.g. the database 112 or within another form of temporary computer memory arranged in association with the server 108. When the user session expires or the user logs out, the key is deleted.

The operation of the client-server environment 100 may be exemplified by means of the following exemplary scheme, for example including the following steps.

In a first step the user signs up for use of the server 108 by providing his username and password. The server 108 then generates the user specific key and temporarily stores the user specific key only temporarily, e.g., in a hardware security module (HSM). A HSM is a physical computing device that safeguards and manages digital keys for strong authentication and provides cryptoprocessing.

Based on the user specific key the server 108 generates an access token and stores the access token in the database 112, in association with the username for the user. The access token has a lifetime, e.g., an expiry date/time, to limit the user's session. In an embodiment the lifetime is no longer than the session where the client device 102, 104, 106 is operationally connected to the server 108.

The access token is specifically "connected" to a response cookie that is to be returned to the user's cookie enabled application running at the client device 102, 104, 106, such as e.g. a browser or any other form of application gaining use of the operation in accordance to the present disclosure.

It may also be possible to in the response cookie include a protected copy of the user specific key, e.g., it can be encrypted with a public key provided form the server 108 and used in a signature process.

In a subsequent process of accessing the restricted user information the client sends a page request to the server 108 together with the cookie, which contains the access token and protected key. The server 1087 may then validate the cookie using a process in line with the above discussion, thereby allowing the user access to his restricted user information.

Figure 3:
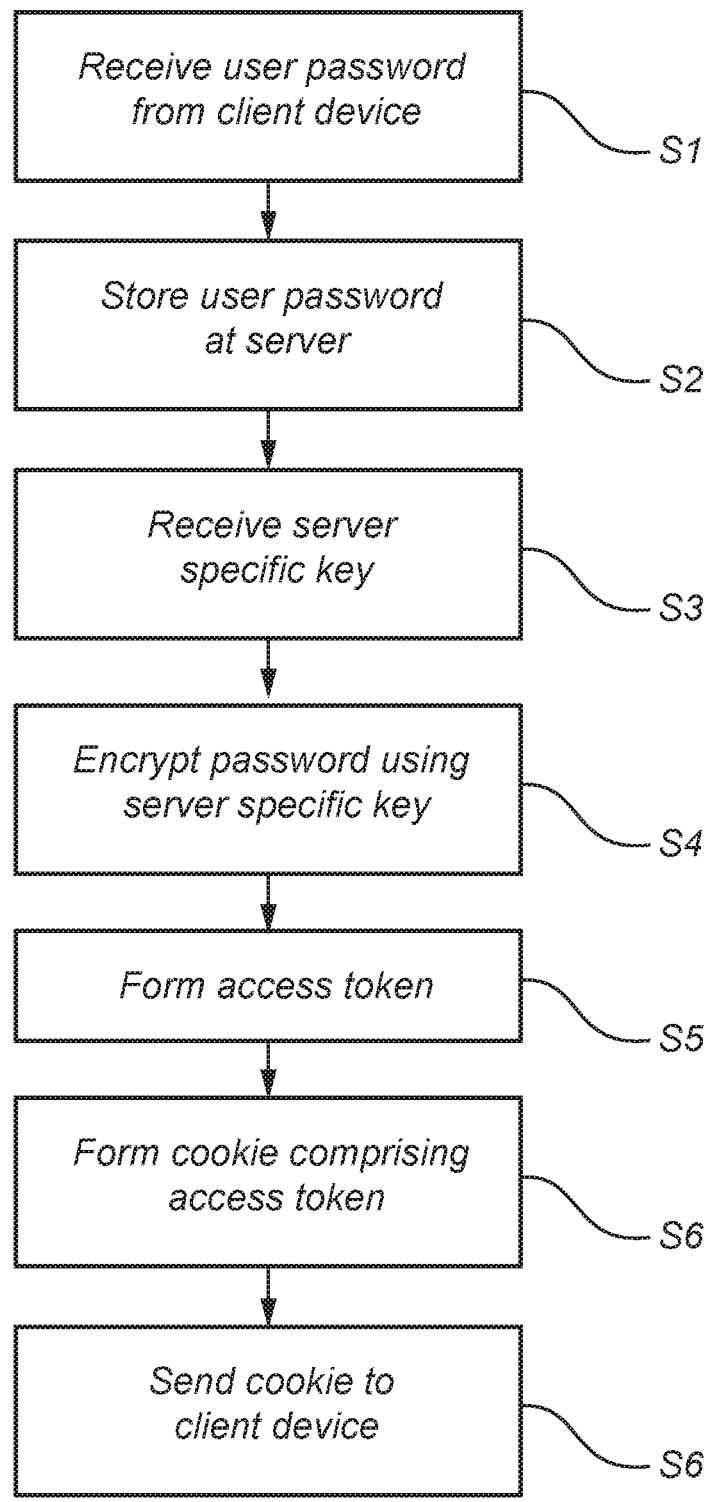
FIG. 3 is a flow chart showing the method steps according to currently preferred embodiments of the present disclosure.

In summary and with further reference to FIG. 3, the present disclosure relates to a computer implemented method for operating a password management system comprising a server arranged in communication with a client device, the client device running a cookie enabled application, wherein the method comprises receiving, S1, at the server 108, a representation of a user password provided from the client device, 102, 104, 106, storing, S2, the representation of the user password at a computer memory 112 associated with the server 108, receiving, S3, at the server 108, a server specific key, encrypting, S4, at the server 108, the password using the server specific key, forming, S5, at the server 108, an access token based on the encrypted password, wherein the access token has a predefined lifetime, forming, S6, at the server, a cookie comprising the access token, and sending, S7, by the server 108, the cookie to the client device for storage in a computer memory arranged in association with the client device 102, 104, 106.

Advantages following the scheme applied by the present disclosure include the possibility of reducing the risk of e.g. a potential hacker getting hold of the "real" user password is reduced, specifically since the hacker in such a case first must get hold of the server specific key. Preferably, the server further comprises a hardware element implemented as a physical unclonable function (PUF), and the server specific key is formed based on information received from the PUF. Accordingly, the server specific key may in such an embodiment not easily be stolen and used at "another location" since the PUF/hardware element is physically connected to the server.

The present disclosure contemplates methods and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the present disclosure. Likewise, software implementations could be accomplished with standard programming techniques with rule-based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art. Variations to the disclosed embodiments can be understood and effected by the skilled addressee in practicing the present disclosure as defined by the claims, from a study of the drawings, the present disclosure, and the appended claims. Furthermore, in the claims, the word "comprising" does not exclude other elements or steps, and the indefinite article "a" or "an" does not exclude a plurality.

What is claimed is:

1. A computer implemented method for operating a password management system comprising a server arranged in communication with a client device, the client device running a cookie enabled application, wherein the method comprises:
    receiving, at the server, a representation of a user password provided from the client device,
    storing the representation of the user password at a computer memory associated with the server,
    receiving, at the server, a server specific key,
    encrypting, at the server, the user password using the server specific key,
    forming, at the server, an access token based on the encrypted user password, wherein the access token has a predefined lifetime,
    forming, at the server, a cookie comprising the access token, and
    sending, by the server, the cookie to the client device for storage in a computer memory arranged in association with the client device.

2. The method according to claim 1, further comprising the step of:
    deleting the user password from the computer memory associated with the server.

3. The method according to claim 1, wherein receiving the representation of the user password comprises:
    receiving, at the server, the user password from the client device,
    forming, at the server, the representation of the user password based on the user password and an at least partly random number.

4. The method according to claim 3, further comprising the step of:
    storing the at least partly random number at the computer memory associated with the server.

5. The method according to claim 4, wherein the at least partly random number is specific for an identity of the user device.

6. The method according to claim 1, wherein the server further comprises a hardware element implemented as a physical unclonable function (PUF), and the server specific key is formed based on information received from the PUF.

7. The method according to claim 1, wherein the lifetime for the access token is based on a session formed between the server and the client device.

8. The method according to claim 1, wherein the lifetime of the access token is set by the client device.

9. A method for allowing access to restricted information stored at a server, the server arranged in communication with a client device, the client device running a cookie enabled application, the method comprising:
    receiving, at the server, a request from the client device for accessing the restricted information, the request including a cookie comprising an access token formed in accordance with claim 1, and
    verifying the access token, at the server, for allowing the client device access to the restricted information.

10. The method according to claim 9, further comprising:
    decrypting the access token to derive the user specific key to access the restricted information.

11. The method according to claim 9, wherein the cookie is removed or made unusable after a predetermined time period.

12. A password management system, the system comprising a server arranged in communication with a client device, the client device running a cookie enabled application, wherein the server is adapted to:
    receive a representation of a user password provided from the client device,
    store the representation of the user password at a computer memory associated with the server,
    receive a server specific key,
    encrypt the user password using the server specific key,
    form an access token based on the encrypted user password, wherein the access token has a predefined lifetime,
    form a cookie comprising the access token, and
    send the cookie to the client device for storage in a computer memory arranged in association with the client device.

13. The system according to claim 12, wherein the server is further adapted to:
    delete the user password from the computer memory associated with the server.

14. The system according to claim 12, wherein the server further comprises a hardware element implemented as a physical unclonable function (PUF), and the server specific key is formed based on information received from the PUF.

* * * * *